H. L. McCRAY.
ATTACHMENT FOR STALK CUTTING MACHINES.
APPLICATION FILED NOV. 20, 1917.

1,278,959.

Patented Sept. 17, 1918.

WITNESSES
Guy M. Spring
S. M. McColl

INVENTOR
Henry L. McCray.
BY Richard Owen
ATTORNEY

UNITED STATES PATENT OFFICE.

HENRY L. McCRAY, OF ST. JO, TEXAS.

ATTACHMENT FOR STALK-CUTTING MACHINES.

1,278,959.   Specification of Letters Patent.   Patented Sept. 17, 1918.

Application filed November 20, 1917. Serial No. 203,002.

*To all whom it may concern:*

Be it known that I, HENRY L. McCRAY, a citizen of the United States, residing at St. Jo, in the county of Montague and State of Texas, have invented certain new and useful Improvements in Attachments for Stalk-Cutting Machines, of which the following is a specification.

This invention relates to agricultural machines, and more particularly to attachments for stalk cutters.

The object of the invention is to provide a protector for the driver of a corn or cotton stalk cutter to prevent flying pieces of stalk or burs from hitting the driver in the face.

Another object is to construct a device of this character which is simple and cheap to manufacture and may be quickly applied to and removed from the cutting machine and which may be adjusted to suit the convenience of the user.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
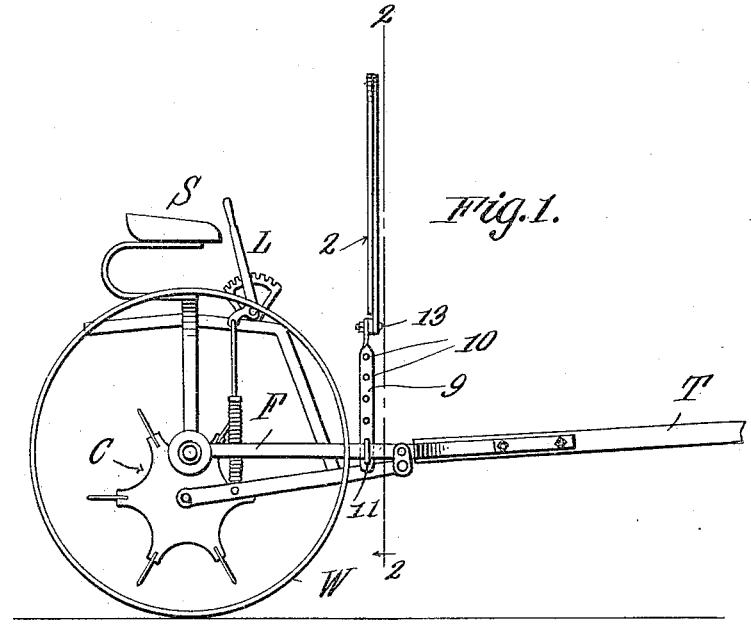
Figure 2:
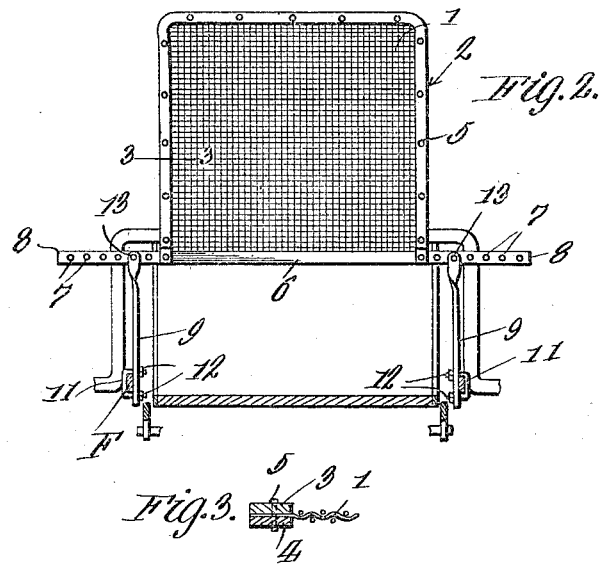
Figure 3:

Figure 1 represents a side elevation of a stalk cutting machine showing the attachment constituting this invention applied, Fig. 2 is a transverse vertical section taken on the line 2—2 of Fig. 1, and Fig. 3 is a detail transverse section taken on the line 3—3 of Fig. 2.

In the embodiment illustrated, a stalk cutting machine of ordinary construction is shown comprising the usual traction wheels W between which is mounted the cutter C with a seat S rising from the frame F thereof, the cutter being vertically adjustable and controlled by the usual lever and ratchet mechanism shown at L. A tongue T is connected with the frame F, said tongue being shown broken off for convenience in illustration.

The attachment constituting this invention comprises a shield composed of any suitable non-breakable transparent material here shown in the form of screen wire 1 mounted in a substantially rectangular frame 2, it being understood that this frame may be of any other desired configuration. The frame 2 is composed of two inverted U-shaped members 3 and 4 secured together by rivets 5 and between which the screen material 1 is clamped (see Fig. 3). The ends of the U-shaped members are secured by riveting or otherwise, to a cross bar 6, the ends of which project beyond the side members of the frame and are provided with a plurality of longitudinally spaced apertures 7 to provide for the lateral adjustment of the shield. These apertured arms or extensions 8 of bar 6 are connected with uprights 9 carried by the frame F. These uprights 9 are here shown in the form of heavy metal straps or bars having their upper ends twisted to adapt them to be bolted to the arms 8 as is shown clearly in Fig. 1. These uprights 9 are provided with a plurality of longitudinally spaced apertures 10 through which pass clamps 11 which are here shown U-shaped and straddle the side bars of the frame F with the legs thereof passing through the apertures in the uprights 9 on opposite sides of said frame bars as is shown clearly in Fig. 2. The ends of these clamps are threaded and provided with nuts 12 for connecting the uprights to the frame, it being obvious that the apertures 10 provide for the vertical adjustment of said uprights relatively to the frame thereby positioning the shield at a greater or lower elevation according to the wishes of the user. It is also obvious that this shield may be laterally adjusted by varying the position of the arms 8 relatively to the uprights 9 which are connected thereto by bolts 13.

The shield frame 2 may be of any desired height and width, the only requirement being that it shall be sufficiently large to protect the driver against flying pieces of stalk and burs during the operation of the cutter, as in many instances, the driver has been known to receive severe injuries from such flying particles.

The screen wire 1 permits the driver to see through it for directing the course of the machine and yet the mesh thereof is fine enough to prevent the passage therethrough of injurious particles. This shield may be readily applied to the frame of the stalk cutter by detaching the clamps 11 and may be quickly applied by inserting said clamps so that it does not in any way interfere with the ordinary operation of the machine.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

1. A shield for stalk cutters comprising a substantially rectangular frame having laterally extending arms provided with a plurality of longitudinally spaced apertures, uprights adjustably connected with said arms and provided with longitudinally spaced apertures, and clamps for engagement with said apertures for connecting said uprights to a support.

2. A shield of the class described comprising an inverted U-shaped frame having a sheet of transparent material secured thereto, a cross bar connecting the ends of said frame and projecting beyond opposite sides thereof to form attaching arms, uprights connected with said arms, and means for adjustably connecting said uprights to the frame of a stalk cutter.

In testimony whereof I affix my signature in presence of two witnesses.

HENRY L. McCRAY.

Witnesses:
JAS. B. LEE,
ALBERT WILLET.

Copies of this patent may be obtained for five cents each, by addressing the "Commissioner of Patents, Washington, D. C."